UNITED STATES PATENT OFFICE.

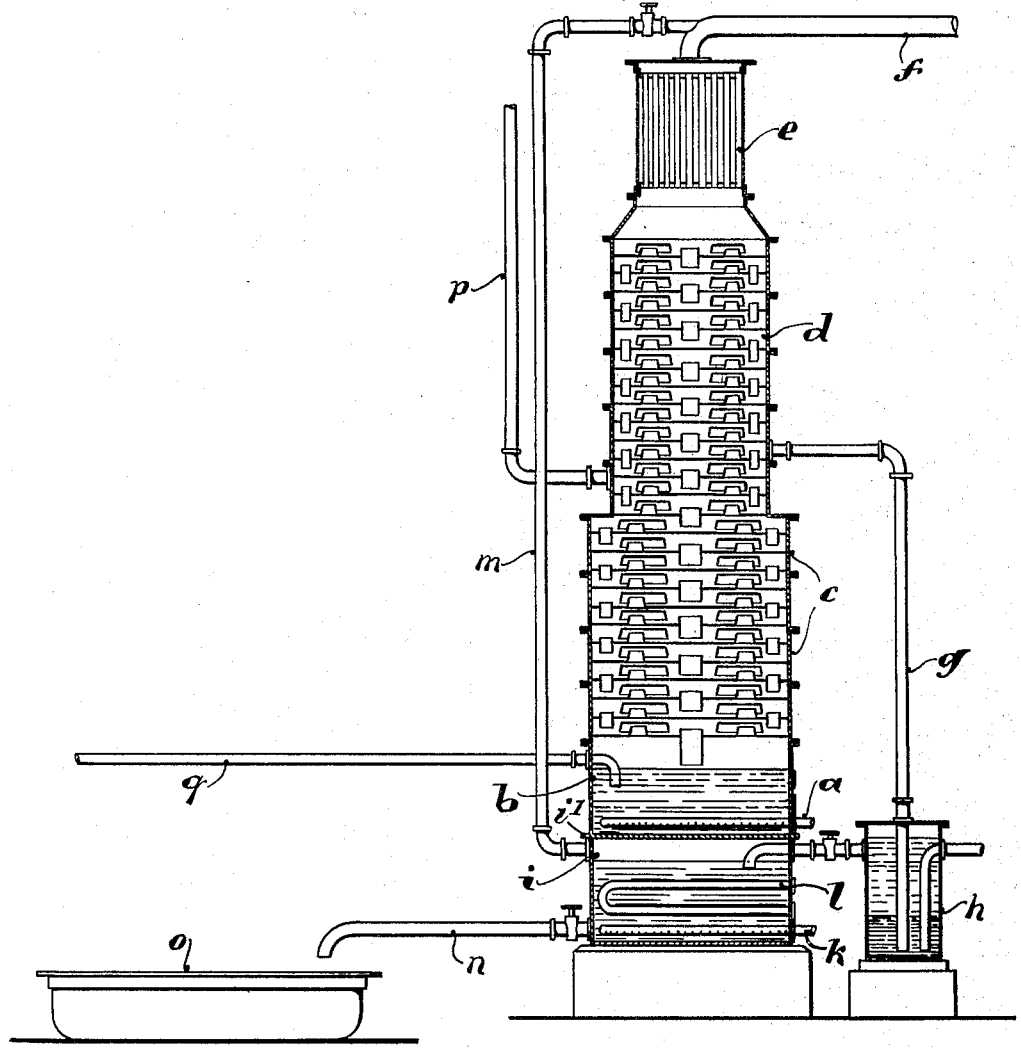

HEINRICH KOPPERS, OF ESSEN-ON-THE-RUHR, GERMANY, ASSIGNOR, BY MESNE ASSIGNMENTS, TO THE KOPPERS COMPANY, A CORPORATION OF PENNSYLVANIA.

APPARATUS FOR SEPARATING LIGHT OILS FROM WASHING-OIL AND REGENERATING THE LATTER.

1,323,396.     Specification of Letters Patent.     Patented Dec. 2, 1919.

Application filed July 8, 1913. Serial No. 777,833.

*To all whom it may concern:*

Be it known that I, HEINRICH KOPPERS, residing at Essen-on-the-Ruhr, in Germany, have invented certain new and useful Improvements in Apparatus for Separating Light Oils from Washing-Oil and Regenerating the Latter, of which the following is a specification.

This invention relates to a novel apparatus for recovering the light oils contained in certain gases from the washing oil and for simultaneously regenerating the latter so as to be again adapted for washing purposes. According to the present invention, the condensate obtained by an effective condensation and containing essentially, wash oil, light oil, water and naphthalene is subjected to distillation in order to recover the light oils therefrom, the generated light oil vapors being admixed to the main current of such vapors, while the residual matter is added to the washing oil after the naphthalene has been separated therefrom.

As is well known in the art, the light oils contained in gases are separated therefrom by means of washing oils, whereupon a recovering of the light oil from the washing oil is effected by means of distillation. It is however, unavoidable that during this distillation certain constituents of the heavy washing oil pass over together with the light oil vapors for the reason that notwithstanding their different boiling points, an exact separation of both oils is practically impossible. According to the present invention, these difficulties are obviated by subjecting the generated vapor mixture to fractional condensation to form a condensate which embodies all of the constituents having a high boiling point. This condensate is then subjected to distillation and the light oil thus separated is added to the bulk of said oil. The residual matter is freed from naphthalene and then added to the washing oil. Owing to this method the washing oil, light oil and naphthalene may be effectively separated so as to obtain pure final products.

With the above condensation it is entirely immaterial whether a more or less considerable portion of the light oil becomes dissolved in the washing oil, as this portion is subsequently returned to the bulk of the light oil. The condensation may be so regulated that almost all of the constituents of the washing oil are retained and that owing to the subsequent separation of the light oil from the washing oil by means of a second distillation, the washing oil is recovered in such a form as to be adapted for reuse as a washing agent. It is obvious that the washing effect of the oil is the more reduced the more light oils are contained therein, the best effect being of course obtained with washing oil that is entirely free from light oils.

Finally the method described permits a complete separation of the naphthalene. This substance when present in the washing oil entails considerable difficulties during the recovering of the light oil, so that the naphthalene should be completely removed during the regeneration of the washing oil. It is a well known fact that naphthalene is readily dissolved in the light oils so that it is difficult to separate it from a mixture of the light oil and washing oil. As with the present apparatus, the light oil is first separated from the mixture containing naphthalene, the subsequent separation of the naphthalene by cooling does not offer any difficulties whatsoever.

The accompanying drawing represents a sectional elevation of an apparatus embodying my invention.

The letter $a$ designates a pipe for injecting steam into a distilling chamber $b$. On top of this chamber are arranged the several compartments of a first distilling column $c$, the latter in turn supporting a similar second distilling column $d$, upon which finally rests a fractional condenser $e$. Below the first distilling chamber $b$ is arranged a second distilling chamber $i$ separated from chamber $b$ by an intervening partition $i^1$. Within chamber $i$ is located a pipe $k$ that delivers free steam, and a pipe $l$ which is an imperforate steam pipe. Distilling column $d$ is connected to a water separator $h$ through a pipe $g$, entering column $d$ at a point above the outlet end of pipe $p$, the water separator being in turn connected to chamber $i$. From the latter leads a pipe $m$ to the pipe $f$ that forms the outlet of the fractional condenser $e$. Distilling chamber $i$ is finally connected by a pipe $n$ with a cooling pan $o$.

The operation of the apparatus above described is as follows:

The washing oil laden with light oil is introduced into the apparatus at $p$ and flows through column $c$ to be here subjected to the distillation caused by the steam admitted through heater $a$ and rising through said column. The residual matter is discharged from chamber $b$ through outlet $q$ to be again used for washing purposes after sufficient cooling. The light oil vapors driven off by the above described distillation will rise through the column $d$ and the fractional condenser $e$ which latter is so operated that pure light oil vapors only are admitted into pipe $f$, said vapors being subsequently liquefied in any suitable manner. Any condensate formed in condenser $e$ and consisting mainly of the constituents having high boiling points, falls back into the column whereby it is enriched with wash oil and naphthalene and dissolves the rising vapors. The condensate thus enriched is discharged through pipe $g$ into the water separator $h$. After being there freed from water, it enters chamber $i$ to be here heated to such an extent as to cause the volatilization of the light oil dissolved by the heavy washing oil during the above condensation. The light oil vapors thus produced are discharged through pipe $m$ into pipe $f$ to be here mixed with the bulk of the light oil vapors discharged from the fractional condenser $e$, although it is obvious that the light oil vapors discharged from chamber $i$ may be separately liquefied without departing from the spirit of my invention. The residual matter is discharged from chamber $i$ into the cooling pan $o$ through the conduit $n$, in which pan the naphthalene is obtained by crystallization, and the separation of the naphthalene may be facilitated by mechanical means such as a centrifugal machine. After the separation of the naphthalene, the residue is mixed with the bulk of the washing oil to be again ready for use as a washing agent.

What I claim as my invention and desire to secure by Letters Patent of the United States is:—

1. An apparatus of the character described, comprising a first distilling chamber, a first distilling column mounted thereon, a second distilling column mounted on the first named column, means for admitting wash oil laden with light oil to one of said columns, a condenser mounted on the second column, a vapor pipe communicating with the condenser, a second distilling chamber, means for connecting the second distilling column with said second distilling chamber, and a second vapor pipe communicating with said second distilling chamber, said second vapor pipe entering the first named vapor pipe.

2. An apparatus of the character described, comprising a first distilling column, means for heating said column, a second distilling column mounted on the first named column, an inlet pipe entering the second column, a condenser mounted on said second column, a distilling chamber, and an outlet pipe having its receiving end at a point of the second column above the discharge end of the inlet pipe and communicating with said chamber.

3. An apparatus of the character described, comprising a distilling column, a condenser arranged to receive products from said column, a vapor pipe connected with the outlet of the condenser, a distilling chamber, means for conveying to said chamber, products from a point of said distilling column, and a second pipe for conveying vapor from said chamber to the first-named vapor pipe.

4. An apparatus of the character described, comprising a distilling column, means for heating said column, a condenser communicating with the top of said column, a pipe for carrying vapors from said condenser, a liquid separator connected with a point of said column intermediate its top and its bottom, a distilling chamber connected with said separator, and a pipe for leading vapors from said distilling chamber to said first-named pipe.

In testimony whereof I have signed my name to this specification in the presence of two subscribing witnesses.

HEINRICH KOPPERS.

Witnesses:
HENRY HASPER,
WOLDEMAR HAUPT.